United States Patent [19]
Yanagisawa

[11] Patent Number: 5,558,180
[45] Date of Patent: Sep. 24, 1996

[54] BEARING LUBRICATING APPARATUS FOR ROTARY MACHINE

[75] Inventor: Kiyoshi Yanagisawa, Kanagawa-ken, Japan

[73] Assignee: Ebara Corporation, Tokyo, Japan

[21] Appl. No.: 421,152

[22] Filed: Apr. 10, 1995

[30] Foreign Application Priority Data

Apr. 12, 1994 [JP] Japan .................................. 6-073054

[51] Int. Cl.$^6$ .................................................. F01M 9/06
[52] U.S. Cl. ........................ 184/11.2; 184/13.1; 184/31
[58] Field of Search ................................ 184/6.16, 11.1, 184/11.2, 13.1, 31; 418/94

[56] References Cited

U.S. PATENT DOCUMENTS

| 3,503,469 | 3/1970 | Renz et al. . | |
|---|---|---|---|
| 4,850,827 | 7/1989 | Eiermann | 418/94 |
| 4,987,974 | 1/1991 | Crouch . | |

FOREIGN PATENT DOCUMENTS

| 315761 | 5/1989 | European Pat. Off. . | |
|---|---|---|---|
| 458499 | 11/1991 | European Pat. Off. . | |
| 573063 | 12/1993 | European Pat. Off. . | |
| 635757 | 3/1928 | France . | |
| 922093 | 1/1955 | Germany . | |
| 0134299 | 8/1983 | Japan | 184/31 |
| 58-193997 | 11/1983 | Japan . | |
| 5-340371 | 12/1993 | Japan . | |
| 0324687 | 2/1930 | United Kingdom | 418/94 |

OTHER PUBLICATIONS

European Search Report; Dated: Aug. 10, 1995; Ref. No. Y-E-14122/E6519; citing above listed references.

*Primary Examiner*—Edward K. Look
*Assistant Examiner*—Christopher Verdier
*Attorney, Agent, or Firm*—Armstrong, Westerman, Hattori, McLeland & Naughton

[57] ABSTRACT

A bearing lubricating apparatus for a rotary machine has a rotary shaft rotatably supported by a rolling bearing, and an oil receiving portion which receives lubricating oil picked up by a pick-up member. The oil in the oil receiving portion is sucked by a suction nozzle and is sent to interior of the rotary shaft through a first passage. Then, the oil flows back through a second passage into the bearing. Oil supply nozzles are formed in the rotary shaft so that the oil is supplied to the bearing by a pumping action of the oil supply nozzles when the rotary shaft rotates.

5 Claims, 3 Drawing Sheets

BEARING LUBRICATING APPARATUS FOR ROTARY MACHINE

BACKGROUND OF THE INVENTION:

1. Field of the Invention

The present invention relates to a bearing lubricating apparatus for a rotary machine wherein a rotary shaft is rotatably supported within a casing via a bearing, an oil reservoir is disposed below a bearing chamber in which the bearing is contained, and lubricating oil picked up by an oil pick-up member mounted on an end portion of the rotary shaft and immersed into the lubricating oil in the oil reservoir is supplied to the bearing.

2. Prior Arts

As is well-known, various arts for supplying lubricating oil to bearings of rotary machines are already known. For example, an art in which lubricating oil is picked up by an oil disc or an oil gear and the picked-up oil is dropped down along an inner surface of a casing while the oil is supplied to a bearing, or an art in which positive jet lubrication is effected by using a pump as disclosed in JP-A-58-193997 (Patent Public Disclosure No. 193997/83) are known. However, the former art is limited to applications wherein a rotational speed of a rotary member is relatively slow and provides a small amount of lubricating oil, whereas, the latter art inevitably makes the construction complicated and bulky.

To eliminate the above drawbacks, the Applicant has proposed a technique in which an adequate amount of lubricating oil can easily be supplied to a bearing by the aid of a rotational force of a rotary shaft, as disclosed in JP-A-5-340371 (Patent Public Disclosure No. 340371/93).

To properly understand the present invention, the technique proposed in the above JP-A-5-340371 is shown in FIG. 5 wherein a rotor shaft 42 is rotatably supported within a casing 44 via a rolling bearing 35, an oil reservoir 46 is disposed below a bearing chamber in which the rolling bearing 35 is contained, and lubricating oil is picked up by an oil disc 34 mounted on an end portion of the rotor shaft 42 and immersed into the lubricating oil.

In an inner surface of a cover 41 attached to an end of the casing 44, there is provided a guide groove G for collecting the lubricating oil picked up by the oil disc 34 and flowing down along the inner surface, and a guide plate 32 is disposed at one side of the guide groove G. A suction nozzle 33 for sucking the lubricating oil collected into the guide groove G protrudes into the guide groove. A lubricating passage 37 for guiding the lubricating oil sucked by the suction nozzle 33 is formed in the rotor shaft 42. Oil supply nozzles 38 communicated with the lubricating passage 37 serve to effect a pumping action as the rotor shaft 42 is rotated.

When the rotor shaft 42 is rotated, the lubricating oil sucked from the guide groove G through the suction nozzle 33 by the pumping action generated by a centrifugal force regarding the oil supply nozzles 38 is supplied to the rolling bearing 35 through the lubricating passage 37. By passing the lubricating oil through the lubricating passage 37 formed in the rotor shaft 42 in this way, the rotor shaft 42 is cooled. Since a supply amount of the lubricating oil is determined by a rotational speed of the rotor shaft 42 and diameters of the oil supply nozzles 38 and the suction nozzle 33, the optimum supply amount of the lubricating oil can be obtained by changing the diameters of the nozzles. Incidentally, in FIG. 5, by providing a jacket 43 formed in the cover 41, the lubricating oil in the oil reservoir 46 and the lubricating oil flowing downwardly along the inner surface can be cooled easily. Further, when a bent portion is formed on an end portion of the oil disc 34, a sufficient amount of oil can be picked up. Incidentally, the reference numeral 39 denotes a discharge port of a vacuum pump; 40 denotes a timing gear mounted on the end portion of the rotor shaft 42; 45 denotes a cooling jacket formed in the casing; and 56 denotes a shaft seal.

While the above-mentioned technique itself is effective, since the oil flow is weak in the inner side of the lubricating passage 37, this technique cannot be adopted to applications where a shaft is heated to a high temperature because a bearing cannot be cooled sufficiently.

SUMMARY OF THE INVENTION (Problems which the Invention is to Solve)

Accordingly, an object of the present invention is to provide a bearing lubricating apparatus for a rotary machine wherein a rotary shaft and a bearing can be cooled positively, an adequate amount of lubricating oil can be supplied to the bearing and a difference in temperature between an inner race and an outer race of the bearing can be minimized.

(Means for Solving the Problems)

According to the present invention, there is provided a bearing lubricating apparatus for a rotary machine wherein a rotary shaft is rotatably supported within a casing via a bearing, an oil reservoir is disposed below a bearing chamber in which the bearing is contained, and lubricating oil picked up by an oil pick-up member mounted on an end portion of the rotary shaft and partially immersed into the lubricating oil in the oil reservoir is supplied to the bearing. The bearing lubricating apparatus comprises an oil receiving portion formed in or on an inner surface of the casing near the end of the rotary shaft and adapted to receive the lubricating oil picked up by the oil pick-up member, a suction nozzle for sucking the lubricating oil received in the oil receiving portion, a first passage for directing the lubricating oil sucked by the suction nozzle to an inner side of the rotary shaft opposite to a suction side through the interior of the rotary shaft, a second passage for directing the lubricating oil from the first passage toward the suction side and for supplying the lubricating oil to the bearing, and at least one oil supply nozzle which effects a pumping action to supply the lubricating oil to the bearing as the rotary shaft is rotated. The oil supply nozzle is communicated with either one of the first and second passages.

Preferably, the first passage has a circular cross section which is substantially coaxial with the rotary shaft, the second passage has a ring-shaped cross section disposed around the first passage, and the first and second passages are connected at a portion which is apart from the bearing in an axial direction of the rotary shaft opposite to the suction side of the first passage.

The first passage is communicated with the second passage through holes which direct the oil radially from the first passage into the second passage, and the oil supply nozzle is communicated with the second passage at a portion apart from the holes in the axial direction of the rotary shaft.

The first passage is formed in a closure member of which extension extends into a central bore formed in the rotary shaft, the closure member has an end portion secured to the rotary shaft, a part of said end portion is formed in suction nozzle extending to the oil receiving portion, and the second passage is formed by a space between an inner cylindrical surface of the central bore and an outer surface of the extension of the closer member, and the oil supply nozzle is disposed between the second passage and the bearing.

In the bearing lubricating apparatus according to the present invention, a screw thread is formed on the inner cylindrical surface of the central bore, the end portion of the closure member is secured to said central bore by a part of the screw thread.

A sleeve can be disposed around an outer periphery of the rotary shaft, the second passage is defined between the outer periphery of the rotary shaft and an inner periphery of the sleeve. In this case, the oil supply nozzle is formed between said first passage and the second passage.

In carrying out the present invention, the oil pickup member can be constituted by an oil disc or an oil gear. The oil receiving portion can be constituted by a space of which side and bottom are formed by a plate member fixed to the casing and a part of the casing. Further, the first passage is preferably formed from a pipe member extending through an axial bore formed in the rotary shaft, and the second passage is preferably closed by a screw. In addition, the second passage may be formed from a sleeve disposed on an outer periphery of the rotary shaft.

(Operation of the Invention)

With the arrangement as mentioned above, when the rotary shaft is rotated, the lubricating oil picked up by the oil pick-up member flows along the inner surface of the casing while being received in the oil receiving portion. The lubricating oil received in the oil receiving portion is sucked by the suction nozzle and then is sent to the inner side of the rotary shaft through the first passage, thereby cooling the inner side which is apt to become a high temperature. The oil is then returned to the second passage to be supplied to the bearing disposed on the end portion of the rotary shaft through the oil supply nozzles.

Accordingly, since the inner side of the rotary shaft which is apt to become the high temperature can be cooled by the lubricating oil, the rotary shaft itself can be cooled efficiently, with the result that an amount of heat transmitted from the rotary shaft to the bearing can be minimized to reduce the temperature of the bearing, thereby preventing damage of the bearing and extending service life of the bearing.

DETAILED DESCRIPTION OF THE PREFERRED EMBODIMENTS

Preferred embodiments of the present invention will now be explained with reference to the accompanying drawings.

Figure 1:
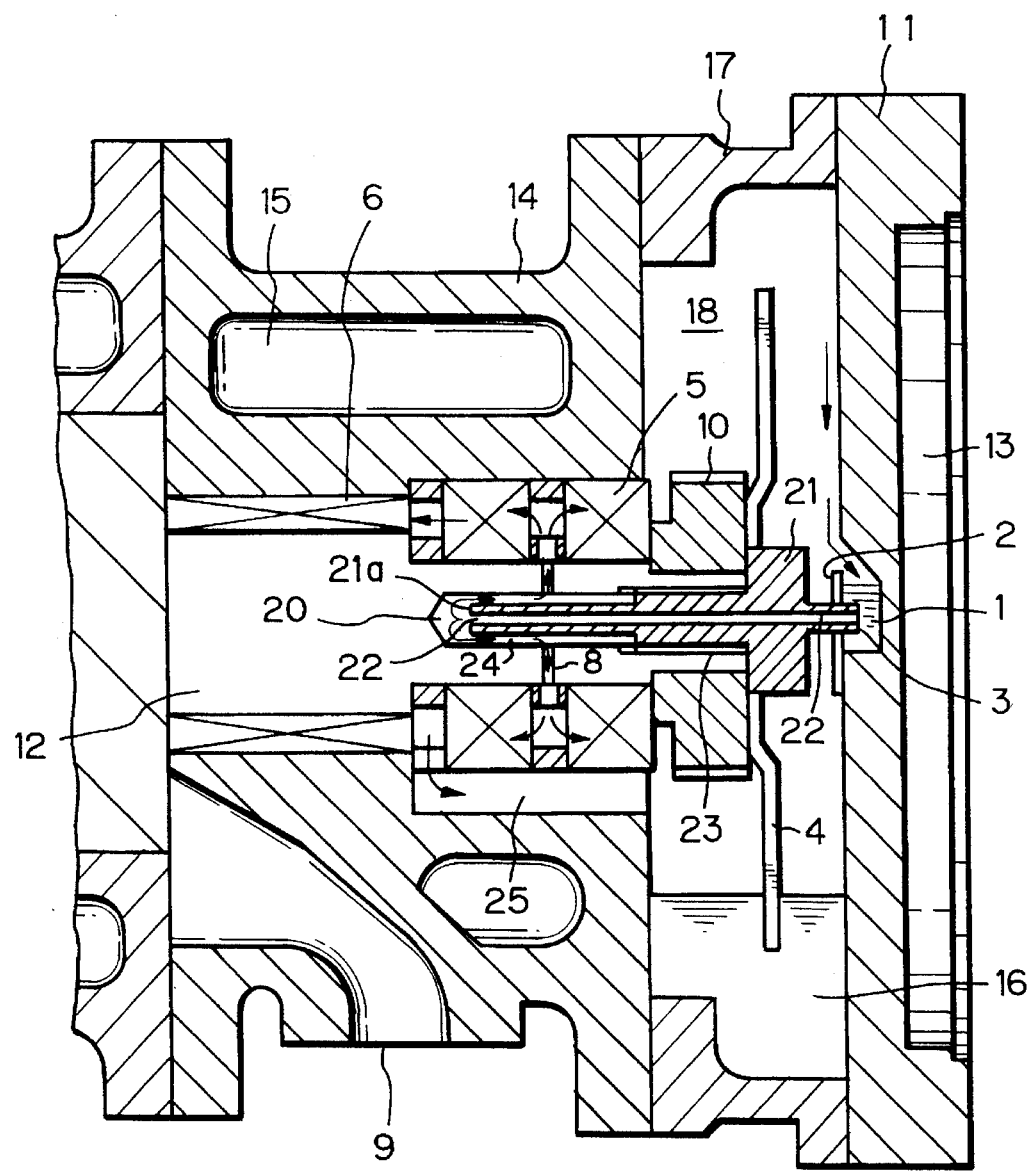
FIG. 1 is a side sectional view showing an embodiment of the present invention.

FIG. 1 is a sectional view showing a bearing structure when a bearing lubricating construction for rotary machines according to the present invention is applied to a vacuum pump of screw type. As shown, a rotary shaft 12 is rotatably supported within a first housing 14 via a rolling bearing 5. A second housing 17 is disposed adjacent to the first housing 14 and the second housing 17 defines an oil reservoir chamber 18. A third housing 11 having an oil receiving portion 1 which will be described later is disposed adjacent to the second housing 17, which third housing 11 forms a cover. In this specification, these housings are generically referred to as a "casing".

An oil reservoir 16 is formed within the second casing 17 at a lower portion thereof, and a timing gear 10 and an oil disc 4 for defining an oil pick-up member are attached to an end of the rotary shaft 12. An oil receiving portion 1 is formed in an inner wall of the third casing 11 in alignment with a center of the rotary shaft 12. A central bore 20 is formed in the end portion of the rotary shaft 12, and a closure member 21 having a first central passage 22 passing therethrough is inserted into the bore 20 and secured to the rotary shaft 12, for example, via a threaded portion 23. A suction nozzle 3 is formed in an end of the closure member 21, and a guide plate 2 for holding the oil in the oil receiving portion 1 is attached to the end portion of the closure member. The suction nozzle 3 protrudes into the oil receiving portion 1.

The closure member 21 has an extension 21a extending up to the proximity of a bottom of the central bore 20, and a second passage 24 is defined between the central bore 20 and the extension 21a. A plurality of oil supply nozzles 8 which extend radially through the rotary shaft 12 are communicated with the second passage 24 so that liquid in the second passage 24 is supplied to the rolling bearing 5 through the nozzles by a pumping action as the rotary shaft 12 is rotated. As a result, the lubricating oil in the oil receiving portion 1 is sucked through the suction nozzle 3.

The oil which lubricates the rolling bearing 5 is returned to the oil reservoir 16 through a discharge passage 25. The oil which lubricated the bearing portion near the shaft end is returned to the oil reservoir 16 directly. In FIG. 1, the reference numeral 9 denotes a discharge port of the vacuum pump; and 13, 15 denote cooling jackets.

Accordingly, the lubricating oil sucked from the suction nozzle 3 is directed toward the interior of the rotary shaft 12 through the first passage 22 and then reversely flows into the second passage 24, from which the oil flows into the bearing through the oil supply nozzles, thereby lubricating the bearing. Thus, the interior of the rotary shaft can be cooled effectively. Incidentally, since a supply amount of the lubricating oil is determined by a rotational speed of the rotary shaft 12 and diameters of the oil supply nozzles 8 and the suction nozzle 3, an optimum supply amount of the lubricating oil can be obtained by changing the diameters of the nozzles. In order to improve the cooling efficiency, it is preferable that the central bore 20 and the extension 21a extend toward an inner side of the rotary shaft beyond the rolling bearing 5. Incidentally, by providing the cooling jacket 13, the lubricating oil in the oil reservoir 16 and the lubricating oil flowing downwardly along the inner surface can be cooled easily.

Figure 2:
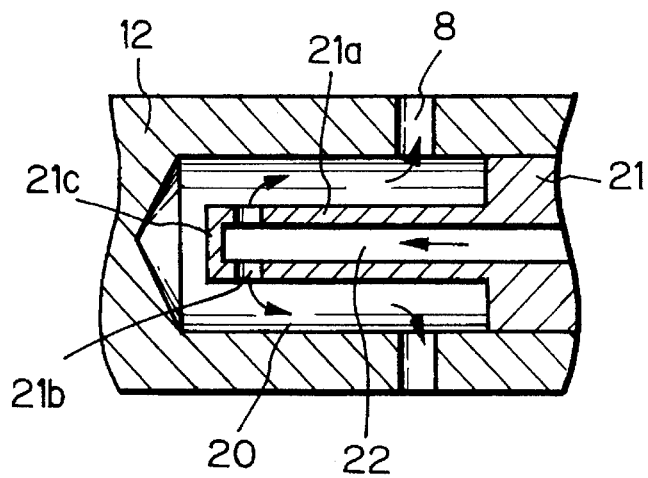
FIG. 2 is a side sectional view showing another embodiment of an extension.

FIG. 2 shows another embodiment of an extension 21a. In the illustrated embodiment, an end 21c of the extension is closed and holes 21b are formed in the wall of the extension near the end thereof. The holes 21b direct the lubricating oil radially from the first passage 22 into the second passage 24.

Figure 3:
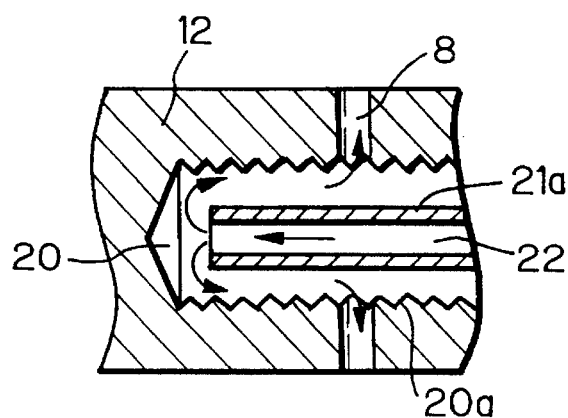
FIG. 3 is a side sectional view showing another embodiment of a central bore.

FIG. 3 shows another embodiment of a central bore 20. In the illustrated embodiment, threads are formed on an inner wall of the central bore to increase a surface area, thereby improving the cooling efficiency.

Figure 4:
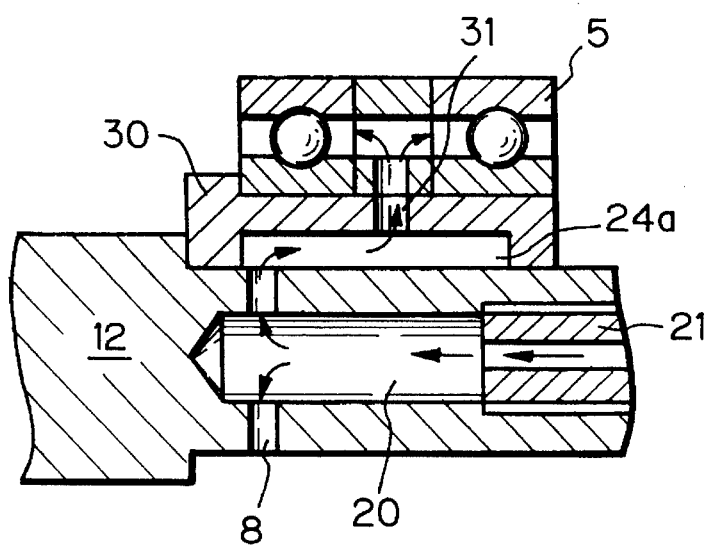
FIG. 4 is a side sectional view showing another embodiment of first and second passages.
Figure 5:
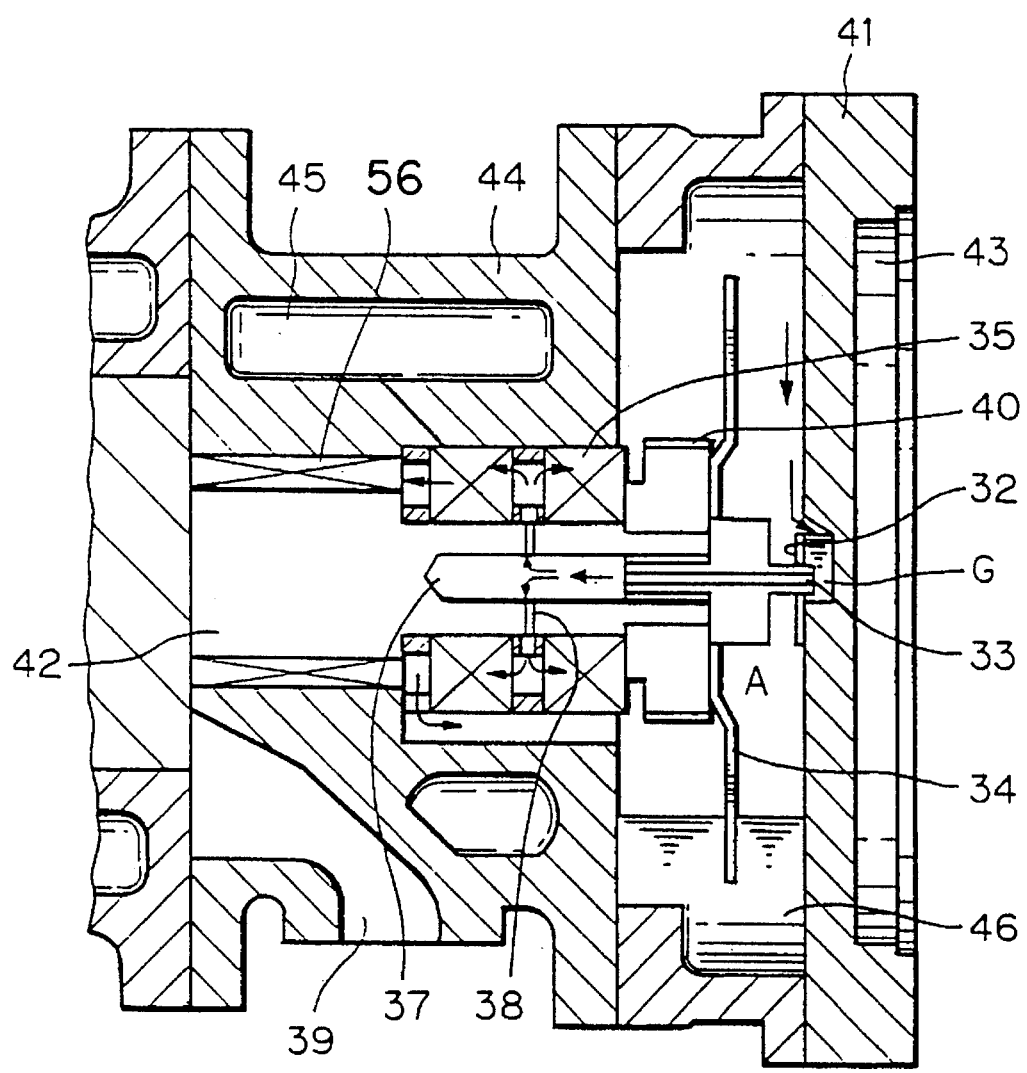
FIG. 5 is a side sectional view of a bearing lubricating apparatus previously proposed by the same Applicant of this application.

FIG. 4 shows an embodiment wherein a second passage 24a is formed around the rotary shaft 12. In this embodiment, a plurality of oil supply nozzles 8 are formed in the wall of the rotary shaft in the proximity of the bottom of the central bore 20, and a sleeve 30 is disposed around an outer periphery of the rotary shaft 12 so that the second passage 24a is defined between the outer periphery of the rotary shaft 12 and an inner periphery of the sleeve 30. A passage 31 formed in a wall of the sleeve 30 to sent the lubricating oil from the sleeve 30 to the rolling bearing 5. An advantage obtained by this embodiment is substantially the same as that obtained by the embodiment of FIG. 1. Incidentally, it is not necessary that the oil receiving portion 1 is formed in the third casing as shown in FIG. 1, but, for example, an L-shaped guide plate is attached to the inner surface of the third casing to define an oil receiving portion between the L-shaped guide plate and the inner surface of the third casing. In this case, a hole for passing the suction nozzle is formed in the guide plate.

(Effect of the Invention)

As mentioned above, according to the present invention, there are provided the following excellent advantageous effects:

(1) By providing the second passage which serve to flow the oil toward the suction side, the interior of the rotary shaft can be cooled positively.

(2) By using a combination of the oil supply nozzles and the passages, even when the first and second passages are long, an adequate amount of oil can be supplied.

(3) The present invention can be applied particularly to vacuum pumps, dry compressors or the like in which a rotary shaft is apt to be heated to a high temperature.

The present invention has been explained in detail by referring to specific embodiments. However, the present invention is not limit to those explained and shown in the drawings, but may be changed or modified by those skilled in the art within the spirit and scope of the present invention which is defined in the claims appended hereto. For example, the oil pick-up member can be constituted by an oil disc or an oil gear, and the oil receiving portion can be constituted by a space of which side and bottom are formed by a plate member fixed to the casing and a part of the casing.

What is claimed is:

1. A bearing lubricating apparatus for a rotary machine comprising a rotary shaft rotatably supported within a casing via a bearing, an oil reservoir placed below a bearing chamber in which said bearing is disposed, and an oil pick-up member mounted on an end portion of said rotary shaft and partially immersed into a lubricating oil in said oil reservoir, said oil pick-up member picking up the lubricating oil which is thereafter supplied to said bearing, said apparatus characterized by:

an oil receiving portion formed at an inner surface of said casing near said end portion of said rotary shaft and adapted to receive the lubricating oil picked up by said oil pick-up member;

a suction nozzle for sucking the lubricating oil received in said oil receiving portion;

a first passage for directing the lubricating oil sucked by said suction nozzle to an inner side of said rotary shaft opposite to a suction side through the interior of said rotary shaft;

a second passage for directing the lubricating oil from said first passage toward the suction side and for supplying the lubricating oil to said bearing, wherein a screw thread is formed on the surface of said second passageway and extends axially along the length of said second passageway; and at least one oil supply nozzle adapted to effect a pumping action as said rotary shaft is rotated to supply the lubricating oil to the bearing.

2. A bearing lubricating apparatus according to claim 1, wherein said first passage has a circular cross section which is substantially coaxial with said rotary shaft, said second passage has a ring-shaped cross section disposed around said first passage, and said first and second passages are connected at a portion which is apart from said bearing in an axial direction of said rotary shaft opposite to said suction side of said first passage.

3. A bearing lubricating apparatus according to claim 2, wherein said first passage is communicated with said second passage through holes which direct the lubricating oil radially from said first passage into said second passage, and said oil supply nozzle is communicated with said second passage at a portion axially apart from said holes in an axial direction of said rotary shaft.

4. A bearing lubricating apparatus according to claim 2, wherein said first passage is formed in a closure member of which extension extends into a central bore formed in said rotary shaft, said closure member has an end portion secured to said rotary shaft, a part of said end portion is formed in said suction nozzle extending to said oil receiving portion, said second passage is formed by a space between an inner cylindrical surface of said central bore and an outer surface of said extension of said closure member, and said oil supply nozzle is disposed between said second passage and said bearing.

5. A bearing lubricating apparatus according to claim 2, wherein a sleeve is disposed around an outer periphery of said rotary shaft, said second passage is defined between said outer periphery of said rotary shaft and an inner periphery of said sleeve, and said oil supply nozzle is formed between said first passage and said second passage.

\* \* \* \* \*